Oct. 7, 1952    D. S. WILLSON    2,612,905
LEVER ACTUATED VALVE WITH SHIFTING FULCRUM
Filed Dec. 6, 1947    2 SHEETS—SHEET 1

Inventor
David S. Willson
by
Attorney.

Oct. 7, 1952          D. S. WILLSON          2,612,905
LEVER ACTUATED VALVE WITH SHIFTING FULCRUM
Filed Dec. 6, 1947          2 SHEETS—SHEET 2
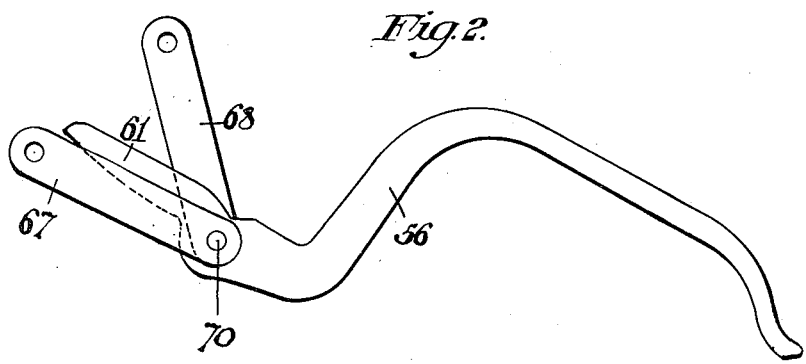
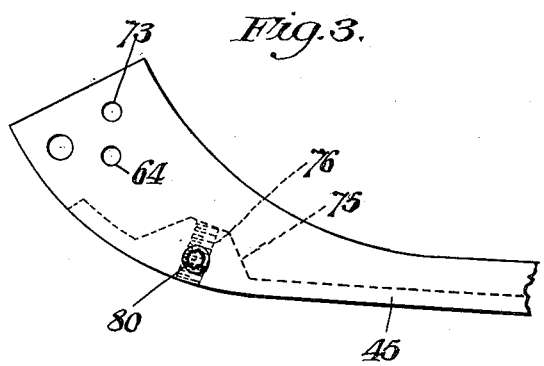
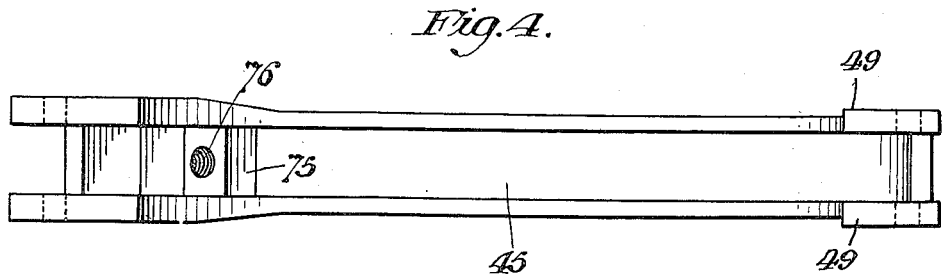
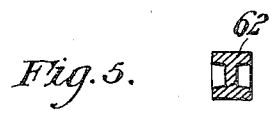
Inventor
David S. Willson,
By [signature]
Attorney.

Patented Oct. 7, 1952

2,612,905

UNITED STATES PATENT OFFICE 2,612,905

LEVER ACTUATED VALVE WITH SHIFTING FULCRUM

David S. Willson, Muskegon Heights, Mich., assignor to John Wood Company, a corporation of Delaware Application December 6, 1947, Serial No. 790,172

6 Claims. (Cl. 137—382)

My invention relates to hose nozzles particularly adapted for use in dispensing gasoline pumps of the type commonly used in service stations, etc. My invention may be used also in other types of apparatus which include a hose or conduit for dispensing fluid.

It is a requirement of the Underwriters' Laboratories, Inc., that there be at least $\frac{1}{16}$-inch clearance between the outer end of the main valve push rod and the operating lever of a nozzle. Such clearance between the push rod and the operating lever is required to accommodate for any tendency of the main valve to seat further down as a result of wear in service of the resilient materials of which the valve is formed. Clearance between the end of the push rod and operating lever prevents any possibility that the main valve might be held open inadvertently, which would result in hazardous leakage of the inflammable fluid dispensed, such as highly volatile and inflammable gasoline.

In the assembly of nozzles of prior art construction, it is the present practice of nozzle manufacturers to select push rods of proper length for each main valve assembly in order to compensate for manufacturing variations in the related parts. Although proper clearance between the push rod and operating lever may be provided in a nozzle when it leaves the factory, nevertheless when the nozzle is placed in service the clearance space gradually becomes decreased due to the seating down of the resilient material from which the main valve is formed. As a result, after a nozzle has been in service for some time, the main valve disc may have to be replaced, or the operator may have to resort to filing off the end of the push rod in order to maintain the necessary clearance sufficient to prevent the main valve from being held partly, or wholly, from its valve seat.

One feature of my invention is to provide a nozzle which may be facilely adjusted in assembly at the factory with the proper clearance space between the end of the main valve push rod and the lever.

Another feature of my invention is to provide a nozzle of a construction which will permit a corrective adjustment of the clearance between the end of the main valve push rod and the operating lever to be made readily and facilely when the nozzle is in use on apparatus in the field.

Another feature of my invention is to provide a nozzle in which the relation of the adjustment block with the coacting curved fulcrum portion of the hand lever provides a maximum mechanical advantage as the valve is being lifted initially from its seat. During the initial lifting of the valve, the force of the liquid tending to hold the valve on its seat is at a maximum value due to the pressure of the fluid dispensed from a dispensing pump.

Another feature of my invention is that the main valve opening means is gradually and progressively changed by a rolling action until the main valve is opened wide and the mechanical advantage is decreased to a minimum.

Another feature of my invention is that my improved nozzle is so constructed that the total main valve travel, or lift from its seat, is considerably greater than is usual in a conventional hose nozzle valve of the present constructions. Such an increase in total valve travel, or lift, results in a reduced resistance to the flow of liquid, with a corresponding reduction in motor load, etc.

Another feature of my invention is that my nozzle is so constructed that irrespective of the slight variation which might be made in the mechanical advantage at the point where the valve starts to be lifted from its seat by the initial adjustment, the final opening point and the final mechanical advantage is not affected appreciably by any such adjustment. Such feature may be observed from the geometric relation in which the adjustment block is pivoted at a position near the end of the adjustment block used at wide open valve position. The pivot is so located that adjustment of the block merely causes the end point to rotate slightly in an arc at the same overall heighth as related to the lever and push rod, thus affecting the total valve opening only to an unappreciable degree.

Another feature of my invention is that the geometric relationship between the lever and main valve push rod is such that the contact area of the lever on the valve push rod throughout the entire opening and closing cycle of the valve falls in a line substantially coinciding with the axis of the valve push rod. Accordingly, appreciable side thrusts toward and away from the fulcrum are not produced on the valve push rod. As is well known in the art, such side thrusts cause wear in the stuffing box with possible resultant leakage.

Although I conveniently have shown my improved nozzle construction as embodied in a hose nozzle of the type which includes a swivel connection, which construction is disclosed and claimed in my co-pending application Serial No.

722,856, filed January 18, 1947, it is to be understood that my improved construction may be embodied in nozzles of the ordinary construction wherein the nozzle is adapted to be rigidly connected to the end of a dispensing hose or conduit.

My invention includes the various novel features of construction and arrangement hereinafter more definitely specified.

In said drawings:

Fig. 2 is a side elevation of the lever and link means by which said lever is pivotally connected to the guard frame; with the rear link member shown in an upraised position for purposes of clarity.

Fig. 3 is a fragmentary side elevation of a portion of the nozzle guard.

Fig. 4 is a top plan view of the nozzle guard.

Fig. 5 is a vertical sectional view of the adjustment block shown in Fig. 1, taken on the line 5 in Fig. 1.

Figure 1:
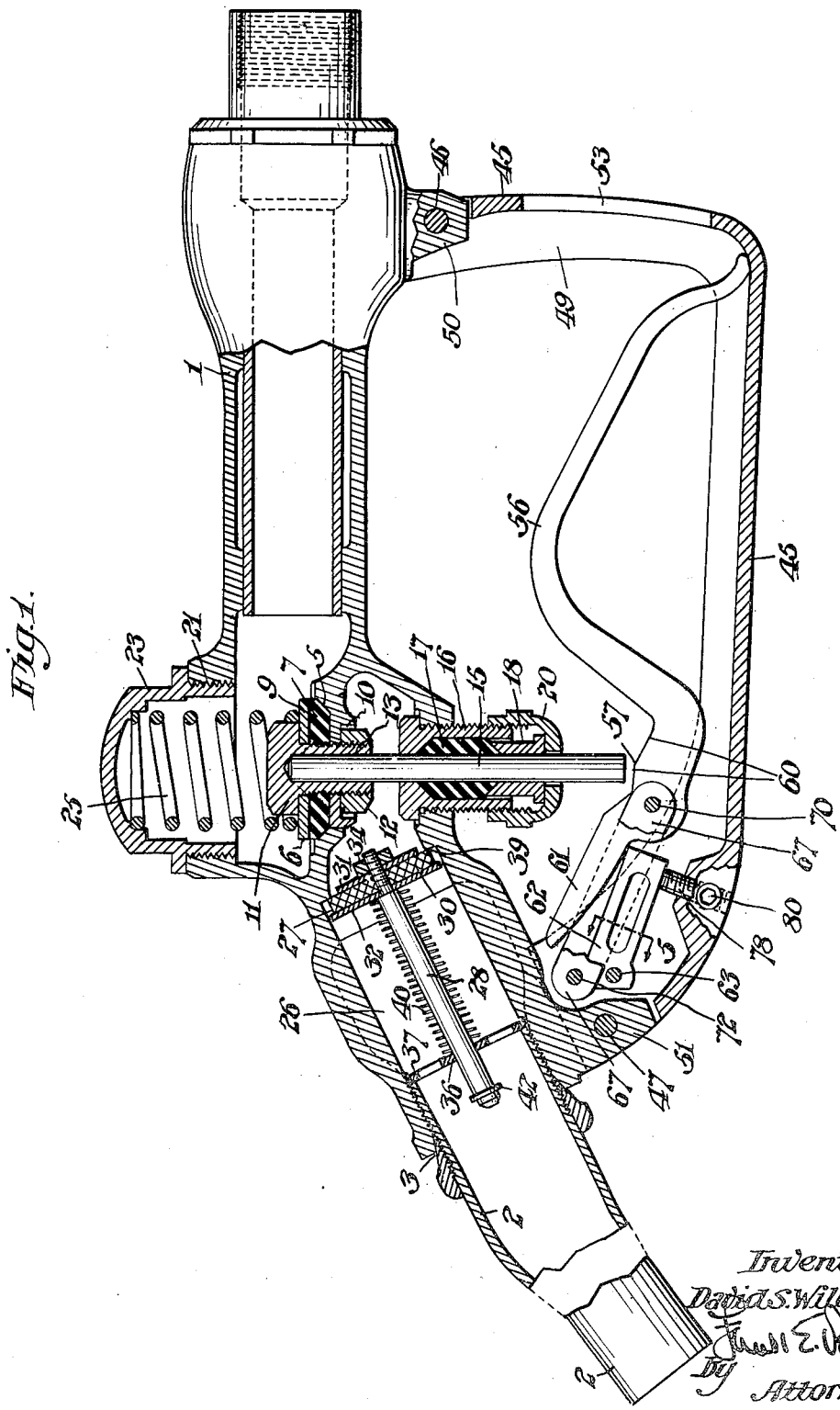
Fig. 1 is a vertical sectional view, partly in elevation, of a nozzle conveniently embodying my invention, with the tubular discharge end of the nozzle being broken away.

Referring to said drawings; the tubular nozzle casing 1 has the conduit 2, of any convenient length and shape, rigidly connected therewith, as at 3, by any convenient means. Said casing 1 is provided with the valve seat 5 for the main valve 6 which, conveniently, includes an annular body 7 of resilient material which is slightly compressible on said seat. The main valve 6 includes an upper valve washer 9, said annular body 7 of resilient material, and a lower washer 10, U-shaped in cross section, all of which are rigidly mounted as a unit on the screw 11 by means of the nut 12. Said screw 11 is provided with an axial opening 13 in which the upper end of the main valve push rod 15 is mounted with slight freedom of movement.

The lower portion of the main valve push rod 15 is mounted to reciprocate in the stuffing box 16 which includes the packing 17, stuffing box gland 18 and stuffing box nut 20.

The nozzle body 1 is provided with the screw threaded opening 21 for the screw cap 23. Said cap 23 forms an abutment for the upper end of the spring 25, the lower end of which bears against the upper surface of the main valve washer 9, and said spring 25 continually tends to move said main valve 6 to closed position.

The casing 1 is provided with an outlet opening 26 in which an outlet valve 27 is located. The outlet valve assembly includes the valve stem 28 provided with a reduced diameter screw threaded portion at its inner end on which the valve disc 30 is rigidly mounted between an inner washer 31 and an outer washer 32 by means of the nut 34. The outer end of said valve stem 28 extends through, and is mounted with freedom of reciprocal movement in, an axial guide opening 36 formed in the outlet valve guide member 37. Said guide member 37 rests freely on the inner end of the conduit 2. The outlet opening 26 portion of the nozzle body 1 has formed therein a valve seat 39 for the valve disc 30. An outlet valve spring 40 continually tends to move said outlet valve 27 toward its seat 39, one end of said spring 40 abutting against the inner surface of the valve guide 37, and the opposite end of said spring 40 engaging the underside of the outer valve washer 32. Said valve stem 28 is provided with the retainer 42 at the outer end of said valve stem 28 to prevent displacement of the spring 40 and valve guide 37 before the tube 2 is assembled in the nozzle body 1 as shown in Fig. 1.

The nozzle guard frame 45 is of general U-shape in cross section, and said guard frame 45, conveniently, is rigidly fastened at its opposite ends to the nozzle body 1 by rivets 46 and 47 which extend, respectively, through the opposite side walls 49 of the guard frame 45 and respective lugs 50 and 51 conveniently formed as an integral part of the nozzle body 1. The guard frame side walls 49, one of which is shown in Fig. 1, form guide means for the operating lever of the nozzle. The nozzle guard frame 45 is provided with an opening 53 therethrough by which the nozzle may be hung on the nozzle support hook of a complete gasoline dispensing pump.

The outer end of the main valve push rod 15 projects in cooperative relation with the sharp corner juncture line 57 of two angular surfaces 60 formed at the top side of the lever 56. Said lever 56 has its fulcrum end 61 curved as a cam for progressive fulcrum contact on the upper surface of the adjustment fulcrum block 62. Said adjustment fulcrum block 62 is pivotally mounted at its left-hand end, as in Fig. 1, on the fulcrum pin 63, the opposite ends of which are mounted in openings 64 formed in the side walls of the left-hand end of the guard frame, as viewed in Fig. 1.

A pair of links 67 and 68 are pivotally mounted at the opposite sides of the fulcrum end 61 of the lever 56 on a pin 70 which extends through one end of said links and through the body of the lever 56. The opposite ends of said links 67 and 68 are pivotally mounted on the pin 72 which extends through openings formed in the left-hand ends of said links 67 and 68 and respective openings 73 formed in the opposite side walls of the left-hand end of the guard frame 45. The links 67 and 68 embrace and form a guideway for both the fulcrum end 61 of the lever 56 and the adjustment fulcrum block 62, both of which, conveniently, are of approximately the same width.

As shown in Figs. 1, 3 and 4; the cross web of the U-shaped guard frame 45 is provided with an upwardly extending boss 75 which has a screw threaded opening 76 therethrough for an adjusting screw 78, the upper end of which engages the under surface of the adjustment block 62 to adjustably locate the adjustment block 62 in proper position. The adjusting screw 78 is conveniently maintained in adjusted position by means of a set screw 80 in a screw threaded opening formed in the guard frame 45 at right angles to said screw opening 76.

Operation

With my improved nozzle assembled in manufacture as shown in Fig. 1; the adjusting screw 78, in engagement with the underside of the adjusting block 62, is raised or lowered to effect a raising or lowering of the block 62, about its pivot 63, to cause the lever 56, the fulcrum end 61 of which is in engagement with the upper surface of the block 62, to be raised or lowered to provide the desired clearance of at least $\tfrac{1}{16}$ of an inch between the lower end of the main valve push rod 15 and the sharp cornered juncture line 57 of the lever which engages the lower end of the main valve push rod 15 upon operation of the lever 56 by the operator. When the push rod 15 and lever 56 are in the desired relationship, the adjusting screw 78 is clamped in adjusted position by the set screw 80.

Assuming the nozzle to be attached to the distal end of the hose of a dispensing gasoline pump and with the motor and pump operating; the operator grasps the nozzle 1 in his palm with his fingers extending through the space between the lever 56 and the guard frame 45. When the lever 56 is lifted, the sharp cornered juncture line 57 of the lever engages the main valve push rod 15 on a line substantially coinciding with the axis of said push rod, and substantially the same relative position continues throughout the entire opening and closing cycle of the valve. The curved cam surface of the fulcrum end 61 of the lever initially engages the right-hand end of the block 62 substantially on a line contact, and maximum mechanical advantage, or leverage, is secured during the initial opening movement of the valve.

The fulcrum contact point between the curved fulcrum end 61 and the top surface of the block 62 progressively shifts to the left as in Fig. 1, along the top surface of the adjustment block 62 during the opening movement of the lever. Such progressive change in fulcrum point by a "rolling" action continues until the main valve is opened wide, and at which point the mechanical advantage has decreased. It is to be noted that cooperative relationship between the curved end 61 and the top of the block 62 is such that a greater main valve travel may be obtained than is usual with nozzles of the prior art constructions. With such an increase in valve opening travel, or lift, there results a reduced resistance to the flow of liquid, with a corresponding reduction in motor load, etc., because the valve port is relatively unobstructed.

The outlet valve 27 is of the well known type, and is included in a nozzle to prevent draining of the hose and nozzle when the pump is not operating, and to prevent liquid from being dispensed unless at a pressure at least sufficient to overcome the effective forces of the outlet valve spring 40 which continually tends to maintain the outlet valve 27 in closed position on its seat 39.

If the clearance between the outer end of the main valve push rod and the operating lever should become decreased below the minimum clearance requirements as a result of wear of the materials of which the valve is formed after the nozzle has been in use in the field for some time; the desired clearance may be readily and facilely restored by the simple operation of loosening the set screw 80 and lowering the adjusting screw 78 which is in contact with the adjusting block 62.

I do not desire to limit myself to the precise details of construction and arrangement herein set forth, as it is obvious that various modifications may be made therein without departing from the essential features of my invention, as defined in the appended claims.

I claim:

1. In a liquid dispensing nozzle; the combination with a main valve, including a valve push rod having a valve member, for controlling the passage of liquid through said nozzle; of a lever, including a curved fulcrum portion, said lever adapted to engage and move said push rod for opening said valve member; an adjustment fulcrum block engaged by said lever fulcrum portion, said lever being pivoted intermediate its ends at a point between said fulcrum block and said push rod, whereby the fulcrum is shifted progressively on the surface of said fulcrum block to vary the effective leverage of said lever with respect to said valve, with maximum leverage afforded to initially displace said valve from its seat and with said leverage decreasing as said valve is displaced from its seat; pivot means for said fulcrum block; and means for effecting adjustable movement of said fulcrum block to predetermined position on said fulcrum block pivot means.

2. In a liquid dispensing nozzle including a guard frame; the combination with a main valve, including a valve push rod having a valve member, for controlling the passage of liquid through said nozzle; of a lever, including a curved fulcrum portion, said lever adapted to engage and move said valve push rod for opening said valve member; means pivotally connecting said lever to said guard frame; an adjustment fulcrum block engaged by said fulcrum portion of said lever, said lever being pivoted intermediate its ends at a point between said fulcrum block and said push rod, whereby the fulcrum is shifted progressively on the surface of said fulcrum block to vary the effective leverage of said lever with respect to said valve, with maximum leverage afforded to initially displace said valve from its seat and with said leverage decreasing as said valve is displaced from its seat; pivot means for said fulcrum block; and means for effecting adjustable movement of said fulcrum block to predetermined position on said fulcrum block pivot means.

3. In a liquid dispensing nozzle including a guard frame; the combination with a main valve, including a valve push rod having a valve member, for controlling the passage of liquid through said nozzle; of a lever, including a curved fulcrum portion, said lever adapted to engage and move said valve push rod for opening said valve member; link means pivotally connecting said lever to said guard frame; an adjustment fulcrum block engaged by said fulcrum portion of said lever, said lever being pivoted intermediate its ends at a point between said fulcrum block and said push rod, whereby the fulcrum is shifted progressively on the surface of said fulcrum block to vary the effective leverage of said lever with respect to said valve, with maximum leverage afforded to initially displace said valve from its seat and with said leverage decreasing as said valve is displaced from its seat; pivot means for said fulcrum block; and means for effecting adjustable movement of said fulcrum block to predetermined position on said fulcrum block pivot means.

4. In a liquid dispensing nozzle including a guard frame; the combination with a main valve, including a valve push rod having a valve member, for controlling the passage of liquid through said nozzle; of a lever, including a curved portion, said lever adapted to engage and move said valve push rod for opening said valve member; a pair of links pivotally connected at one end to said lever and pivotally connected at the opposite end to said guard frame; an adjustment fulcrum block engaged by said fulcrum portion of said lever, said lever being pivoted intermediate its ends at a point between said fulcrum block and said push rod, whereby the fulcrum is shifted progressively on the surface of said block to vary the effective leverage of said lever with respect to said valve, with maximum leverage afforded to initially displace said valve from its seat and with said leverage decreasing as said valve is displaced from its seat; pivot means for said fulcrum block; and means for effecting adjustable movement of said fulcrum block to predetermined position on said fulcrum block pivot means.

5. In a liquid dispensing nozzle including a guard frame; the combination with a main valve, including a valve push rod having a valve member, for controlling the passage of liquid through said nozzle; of a lever, including a curved fulcrum portion, said lever adapted to engage and move said valve push rod for opening said valve member; a pair of links pivotally connected at one end to said lever and pivotally connected at the opposite end to said guard frame, said pair of links forming therebetween a guideway for said fulcrum portion of said lever; an adjustment fulcrum block engaged by said fulcrum portion of said lever, said lever being pivoted intermediate of its ends at a point between said fulcrum block and said push rod, whereby the fulcrum is shifted progressively on the surface of said fulcrum block to vary the effective leverage of said lever with respect to said valve, with maximum leverage afforded to initially displace said valve from its seat and with said leverage decreasing as said valve is displaced from its seat; pivot means for said fulcrum block; and means for effecting adjustable movement of said fulcrum block to predetermined position on said fulcrum block pivot means.

6. A structure as in claim 5; wherein said pair of links are positioned to form therebetween a guideway both for said fulcrum portion of said lever and for said fulcrum block.

DAVID S. WILLSON.

REFERENCES CITED

The following references are of record in the file of this patent:

UNITED STATES PATENTS

| Number | Name | Date |
|---|---|---|
| 464,018 | Goubert | Dec. 1, 1891 |
| 1,883,843 | Woodford | Oct. 18, 1932 |

FOREIGN PATENTS

| Number | Country | Date |
|---|---|---|
| 365,667 | Great Britain | of 1932 |
| 376,070 | Great Britain | of 1932 |